US012651473B2

(12) United States Patent
Duraipandian et al.

(10) Patent No.: US 12,651,473 B2
(45) Date of Patent: Jun. 9, 2026

(54) MERGING MULTIPLE MODEL OUTPUTS FOR EXTRACTION

(71) Applicant: Intuit Inc., Mountain View, CA (US)

(72) Inventors: Preeti Duraipandian, Allen, TX (US); Tharathorn Joy Rimchala, San Francisco, CA (US); Peter Caton Anthony, Menlo Park, CA (US)

(73) Assignee: Intuit Inc., Mountain View, CA (US)

( * ) Notice: Subject to any disclaimer, the term of this patent is extended or adjusted under 35 U.S.C. 154(b) by 357 days.

(21) Appl. No.: 18/241,031

(22) Filed: Aug. 31, 2023

(65) Prior Publication Data

US 2025/0078550 A1      Mar. 6, 2025

(51) Int. Cl.
*G06V 30/19* (2022.01)
*G06V 30/416* (2022.01)
(52) U.S. Cl.
CPC ...... *G06V 30/19127* (2022.01); *G06V 30/416* (2022.01)
(58) Field of Classification Search
CPC ........... G06V 30/416; G06V 30/19127; G06V 10/82; G06F 16/288
See application file for complete search history.

(56) References Cited

U.S. PATENT DOCUMENTS 12,266,203 B2 * 4/2025 Khmaissia ....... G06V 30/19013
2024/0370464 A1 * 11/2024 Lehmann ............ G06F 16/3347

OTHER PUBLICATIONS

Kim, et al. (Computer English Translation of Japanese Patent No. JP2023080045 A). (Year: 2023).*
Liu, et al. (Character-Aware Models Improve Visual Text Rendering). (Year: 2023).*
Meng, et al. (Character-Aware Attention-Based End-To-End Speech Recognition). (Year: 2019).*
Huang et al., "LayoutLMv3: Pre-training for Document AI with Unified Text and Image Masking," arXiv, doi 10.48550/ARXIV. 2204.08387v3, 10-pages, Jul. 19, 2022.
Powalski et al., "Going Full-TILT Boogie on Document Understanding with Text-Image-Layout Transformer," arXiv, doi 10.48550/ ARXIV.2102.09550v3, 18-pages, Jul. 12, 2021.

(Continued)

*Primary Examiner* — Daniel G Mariam
(74) *Attorney, Agent, or Firm* — Paradice and Li LLP

(57)          ABSTRACT

Systems and methods for training an encoder-decoder model are disclosed. An example method includes receiving, over a communications network, a plurality of extraction model outputs from a corresponding plurality of extraction models, each extraction model output received from a corresponding extraction model and each extraction model output including a respective plurality of key-value pairs corresponding to extracted text from one or more training documents, receiving, over the communications network, character recognition data corresponding to the one or more training documents, receiving, over the communications network, ground truth key-value data corresponding to the one or more training documents, and training the encoder-decoder model based at least in part on the plurality of extraction model outputs, the character recognition data, and the ground truth key-value data, wherein the trained encoder-decoder model is configured to generate key-value pairs for subsequent outputs of the plurality of extraction models.

20 Claims, 4 Drawing Sheets

(56)               References Cited

OTHER PUBLICATIONS

Rothe et al., "Leveraging Pre-trained Checkpoints for Sequence Generation Tasks," MIT Press, Transactions of the Association for Computational Linguistics, vol. 8, pp. 264-280, (Year: 2022).
Wang et al., "LiLT: A Simple yet Effective Language-Independent Layout Transformer for Structured Document Understanding," arXiv, doi 10.48550/ARXIV.2202.13669v1, 11-pages, Feb. 28, 2022.
Xue et al., ByT5: Towards a Token-Free Future with Pre-Trained Byte-to-Byte Models, arXiv, doi 10.48550/ARXIV.2105.13626v3, 16-pages, Mar. 8, 2022.

* cited by examiner

400

Receive, over a communications network, a plurality of extraction model outputs from a corresponding plurality of extraction models, each extraction model output received from a corresponding extraction model and each extraction model output including a respective plurality of key-value pairs corresponding to extracted text from one or more training documents. (402)

Receive, over the communications network, character recognition data corresponding to the one or more training documents. (404)

Receiving, over the communications network, ground truth key-value data corresponding to the one or more training documents. (406)

Train the encoder-decoder model based at least in part on the plurality of extraction model outputs, the character recognition data, and the ground truth key-value data, wherein the trained encoder-decoder model is configured to generate key-value pairs for subsequent outputs of the plurality of extraction models. (408)

*Figure 4*

MERGING MULTIPLE MODEL OUTPUTS FOR EXTRACTION

TECHNICAL FIELD

This disclosure relates generally to methods for training machine learning models, and more specifically to the training of machine learning models to merge extraction model outputs.

DESCRIPTION OF RELATED ART

Machine learning techniques are frequently used for document extraction, that is, determining the layout and content, such as strings of alphanumeric content, layouts, and field types, of an input document image. However, multiple techniques exist for such document extraction, and document extraction models employing different techniques may perform better under differing circumstances, and for differing types of documents.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for training an encoder-decoder model to extract information from one or more documents. An example method can be implemented by an electronic device coupled to the encoder-decoder and include receiving, over a communications network, a plurality of extraction model outputs from a corresponding plurality of extraction models, each extraction model output received from a corresponding extraction model and each extraction model output including a respective plurality of key-value pairs corresponding to extracted text from one or more training documents, receiving, over the communications network, character recognition data corresponding to the one or more training documents, receiving, over the communications network, ground truth key-value data corresponding to the one or more training documents, and training the encoder-decoder model based at least in part on the plurality of extraction model outputs, the character recognition data, and the ground truth key-value data, wherein the trained encoder-decoder model is configured to generate key-value pairs for subsequent outputs of the plurality of extraction models.

In some aspects, the encoder-decoder model includes a first plurality of neural network layers corresponding to an encoder and a second plurality of neural network layers corresponding to a decoder. In some aspects, the encoder is configured to generate a plurality of hidden state representations of source text from the one or more training documents. In some aspects, the decoder is configured to receive the plurality of hidden state representations and generate a sequence of output key-value pairs corresponding to respective entries in the source text. In some aspects, key-value pairs of the sequence of output key-value pairs are separated by a predetermined delimiter. In some aspects, the first plurality of neural network layers and the second plurality of neural network layers include respective pluralities of recurrent neural network (RNN) layers.

In some aspects, the encoder-decoder model includes a character-aware text encoder-decoder model.

In some aspects, the plurality of extraction model outputs are each based at least in part on the character recognition data corresponding to the one or more training documents.

In some aspects, training the encoder-decoder model includes training the encoder-decoder model to solve a multimodal text generation problem based at least in part on the ground truth key-value data. In some aspects, an input to the multimodal text generation problem is constructed from the character recognition data and the plurality of extraction model outputs. In some aspects, the input to the multimodal text generation problem is further based at least in part on at least one extraction confidence score associated with a respective extraction model output of the plurality of extraction model outputs.

In some aspects, the method further includes generating an input to the encoder-decoder model based at least in part on concatenating the extraction model outputs of the plurality of extraction model outputs. In some aspects, concatenating the extraction model outputs includes generating a plurality of field predictions separated by a first predetermined delimiter, where each field prediction includes a field name and an ordered plurality of predicted field values separated by a second predetermined delimiter, where each predicted field value is generated by a different extraction model, and includes a predicted value associated with the field name. In some aspects, generating the input to the encoder-decoder model further includes concatenating layout information corresponding to the one or more training documents with the extraction model outputs, the layout information indicating one or more bounding boxes associated with the one or more training documents.

In some aspects, the method further includes, after training the encoder-decoder model, receiving a plurality of subsequent outputs from the plurality of extraction models, the subsequent outputs indicating predicted key-value pairs associated with one or more subsequent documents, and predicting, using the trained encoder-decoder model, a sequence of output key-value pairs corresponding to the one or more subsequent documents.

Another innovative aspect of the subject matter described in this disclosure can be implemented as a system for training an encoder-decoder model to extract information from one or more documents. The system can be associated with the encoder-decoder model and include one or more processors and a memory storing instructions for execution by the one or more processors. Execution of the instructions causes the system to perform operations including receiving, over a communications network, a plurality of extraction model outputs from a corresponding plurality of extraction models, each extraction model output received from a corresponding extraction model and each extraction model output including a respective plurality of key-value pairs corresponding to extracted text from one or more training documents, receiving, over the communications network, character recognition data corresponding to the one or more training documents, receiving, over the communications network, ground truth key-value data corresponding to the one or more training documents, and training the encoder-decoder model based at least in part on the plurality of extraction model outputs, the character recognition data, and the ground truth key-value data, wherein the trained encoder-decoder model is configured to generate key-value pairs for subsequent outputs of the plurality of extraction models.

Another innovative aspect of the subject matter described in this disclosure can be implemented as a non-transitory computer readable storage medium storing instructions for execution by one or more processors of an electronic device coupled to an encoder-decoder model. Execution of the instructions causes the electronic device to perform operations including receiving, over a communications network, a plurality of extraction model outputs from a corresponding plurality of extraction models, each extraction model output received from a corresponding extraction model and each extraction model output including a respective plurality of key-value pairs corresponding to extracted text from one or more training documents, receiving, over the communications network, character recognition data corresponding to the one or more training documents, receiving, over the communications network, ground truth key-value data corresponding to the one or more training documents, and training the encoder-decoder model based at least in part on the plurality of extraction model outputs, the character recognition data, and the ground truth key-value data, wherein the trained encoder-decoder model is configured to generate key-value pairs for subsequent outputs of the plurality of extraction models.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 4 shows an illustrative flow chart depicting an example operation for training an encoder-decoder model to extract information from one or more documents, according to some implementations.

Like numbers reference like elements throughout the drawings and specification.

DETAILED DESCRIPTION

Figure 1:
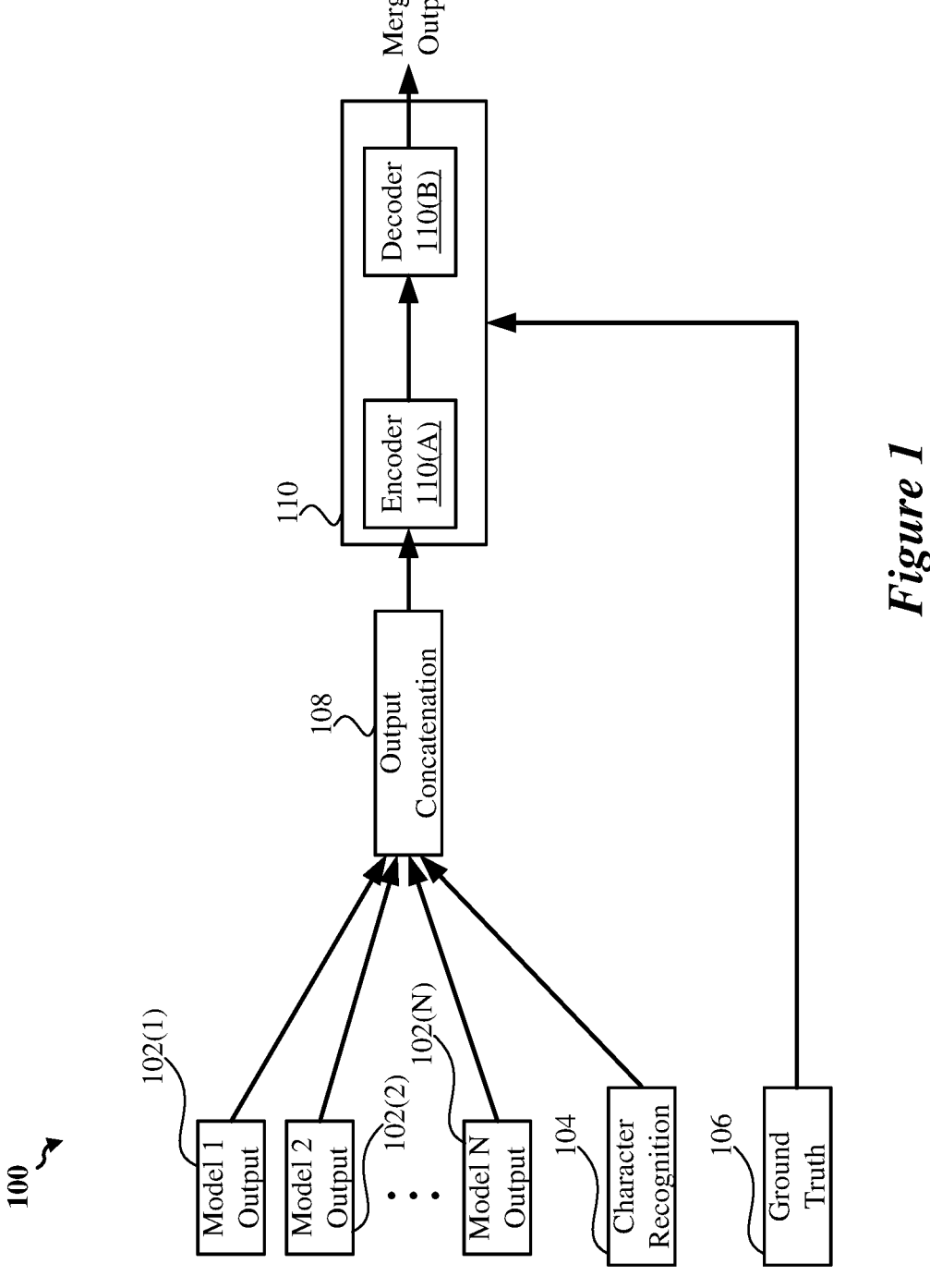
FIG. 1 shows an example merged extraction system, according to some implementations.

Machine learning models may often be used for document extraction, where an image of a document is provided as input, and the output includes text for one or more portions of the document. Such a machine learning model may be referred to as an extraction model. In some aspects, such document extraction may include the extraction of structured information from a document, such as key information extraction (KIE), which may include the extraction of key-value pairs from documents. For example, an extraction model may identify fields (i.e., the "key" in key-value pairs) within a document in addition to the text contained within corresponding identified fields (the "value" in key-value pairs). There are a variety of different extraction models, each of which may have different characteristics, and thus may offer different advantages and drawbacks when extracting differing types of documents. Thus, different extraction models are preferable for extraction of different types of documents or certain types of fields within documents. Because different extraction models may be preferable for different types of documents or different fields within documents, it would be desirable to combine multiple extraction models in order to benefit from their respective strengths and mitigate their respective weaknesses.

Implementations of the subject matter described in this disclosure may be used to generate improved document extraction data based on merging the outputs of multiple extraction models using an encoder-decoder. The encoder-decoder is trained based on outputs of the multiple extraction models, character recognition data, and ground truth values associated with a set of training documents. The trained encoder-decoder is configured to generate merged outputs by framing the merging problem as a multimodal text generation problem in which an input of the encoder-decoder is constructed from the character recognition data and outputs of the multiple extraction models. In some aspects, the outputs of the multiple extraction models, and the merged outputs include a plurality of key-value pairs representing the key information entities of the input document. These, and other aspects of the example implementations are discussed further below.

Various implementations of the subject matter disclosed herein provide one or more solutions to the technical problem of improving the accuracy of key information entities extracted from documents using extraction models. As discussed above, different extraction models may have respective benefits and drawbacks. In contrast, the present implementations may merge the outputs of multiple extraction models using a trained encoder-decoder in order to improve the accuracy of extracted key information entities beyond that of any of the extraction models which feed the encoder-decoder. Training the encoder-decoder to solve a multimodal text generation problem in which an input to the encoder-decoder is constructed from the character recognition data and outputs of multiple extraction models may significantly improve the accuracy of extracted key information entities. Thus, the example implementations allow a document extraction system to reap the benefits of the underlying extraction models while minimizing the drawbacks. More specifically, various aspects of the present disclosure provide a unique computing solution to a unique computing problem that did not exist prior to the use of machine learning models for extracting text from input document images. As such, implementations of the subject matter disclosed herein are not an abstract idea such as organizing human activity or a mental process that can be performed in the human mind-indeed, the human mind is not capable of training a machine learning model, much less of training a machine learning model to merge outputs from multiple extraction models to generate a single merged output.

Moreover, various aspects of the present disclosure effect an improvement in the technical field of machine learning prediction by training a machine learning model to merge outputs of multiple extraction models. For example, Applicant has found that the accuracy of the example merged extraction systems and techniques described herein identify key-value pairs in input documents with a greater accuracy as compared to other techniques, such as single extraction model-based techniques, or simple merging systems where multiple extraction models are employed, and the output having the highest calibrated confidence is selected for each value from among the multiple extraction model outputs.

Using a merged extraction system thus results in more accurate text extraction as compared to such conventional techniques.

FIG. 1 shows an example merged extraction system 100, according to some implementations. The merged extraction system 100 is shown to receive a plurality of extraction model outputs 102, where each extraction model output 102 is associated with the same input document or document image. The extraction model outputs 102 include outputs 102(1) through 102(N) of respective extraction models (not shown in FIG. 1 for simplicity). The extraction models providing the extraction model outputs 102 may include any extraction model capable of extracting text, such as key-value pairs, from an input document or document image. For example, such extraction models may include pretrained language models which have been tuned for key information extraction (KIE) of the input documents, such as LayoutLM, (including one or more versions), Language-Independent Layout Transformer (LiLT), Text-Image Layout Transformer (TiLT), and so on. In some aspects, the multiple extraction models may be included in the merged extraction system 100, while in some other aspects, the extraction models may be coupled to but not included in the merged extraction system 100. For example, the extraction model outputs 102 may be retrieved via a communications network (such as a local network or bus, an intranet, the Internet, and so on) from the respective extraction models, or from a memory coupled to the respective extraction models, such as a memory within a computing device coupled to the merged extraction system 100 via the communications network.

In addition to the extraction model outputs 102, the merged extraction system 100 also receives character recognition data 104, such as optical character recognition (OCR) data associated with the same input document or input document image as the extraction model outputs 102. Similarly to the extraction model outputs 102, the character recognition data 104 may be retrieved via a communications network (such as a local network or bus, an intranet, the Internet, and so on) from a respective character recognition system, or from a memory coupled to the communications network, such as a memory within a computing device coupled to the merged extraction system 100 via the communications network. While not shown in FIG. 1 for simplicity, this character recognition data 104 may also be provided as input to one or more of the extraction models, for use in generating the extraction model outputs 102.

The extraction model outputs 102, the character recognition data 104 may be received by output concatenation module 108. Concatenation module 108 structures the received extraction model outputs 102, and character recognition data 104 into a format compatible with the encoder-decoder 110. More particularly, this structuring may first include separately concatenating the key information entities from each extraction model output. This may be called concatenating the intra-model outputs. In some aspects, this intra-model output concatenation may be performed by the output concatenation module 108, while in some other implementations, this intra-model concatenation may be performed prior to reception of the extraction model outputs 102 (i.e., the extraction model outputs 102 may be received in a concatenated format). In some implementations, this intra-model concatenation may concatenate a plurality of key-value pairs of the extraction model output, such as for example {Employee Name First: Janice, Employee Name Last: Thomson}, where "Employee Name First" and "Employee Name Last" are field names or keys, and "Janice" and "Thomson" are values of the respective fields.

In some aspects, the output concatenation module 108 may perform inter-model concatenation of the received extraction model outputs 102 and the character recognition data 104. For example, the inter-model concatenation may group the extraction model outputs 102 by field name/key, while separating the respective values of the respective extraction models by a first delimiter, such as "|" or another suitable delimiter. In some aspects, different fields of the inter-model concatenated data may also be separated by a second delimiter different from the first delimiter, such as "||" or another suitable delimiter. Thus, the ordering of the values may indicate which extraction model is associated with which value. As an example, consider a simple system where only two extraction models 102 are present. The inter-model concatenation may include {Employee Name First: Janice|Janet Il Employee Name Last:Thomson|Thomson . . . }. In such an example, the first extraction model identified the value of the Employee Name First field as Janice, while the second extraction model identified this value as "Janet."

In addition to the key-value pairs, the output concatenation module 108 may include the character recognition data 104 in the inter-model concatenated data. For example, the character recognition data 104 may be separated from the key-value data of the extraction model outputs 102 by a third delimiter, such as "$$" or another suitable delimiter different from the first and the second delimiters. Following the simple example above, the inter-model concatenation data may include {Employee Name First: Janice|Janet||Employee Name Last:Thomson|Thomson $$ OCR_DATA}, where "OCR_DATA is the text of the character recognition data 104.

In addition to the extraction model outputs 102 and the character recognition data 104, the inter-model concatenation may also include additional information associated with the input document, such as layout information, bounding boxes, image embedding information, and so on. In some aspects, this additional information may be separated from the key-value information and the character recognition data by a fourth delimiter different from the first, second and third delimiters. Further, the inter-model concatenation may also include additional information about the extraction model outputs, such as confidence scores or other information about the confidence in the extracted text generated by the extraction models.

The output concatenation module 108 may provide the inter-model concatenated data, including the extraction model outputs 102, the character recognition data 104, and optionally the layout information, document image embeddings, and so on, to the encoder-decoder 110. For training purposes, the encoder-decoder 110 also receives ground truth data 106 associated with the same input document or input document image as the extraction model outputs 102 and the character recognition data 104. In some aspects, the ground truth data 106 may be a structured set of ground truth key-value pairs associated with the input document. Such ground truth key-value pairs may be generated for training purposes, such as by hand labeling the input document or documents to be used for training the merged extraction system 100. Similarly to the extraction model outputs 102 and the character recognition data 104, the ground truth data 106 may be retrieved via a communications network (such as a local network or bus, an intranet, the Internet, and so on) or from a memory coupled to the communications network, such as a memory within a computing device coupled to the merged extraction system 100 via the communications network.

The encoder-decoder 110 is configured to receive inter-model concatenated data from the output concatenation module 108 and to generate output text extractions based on this inter-model concatenated data. The output text extractions are merged outputs based on the extraction model outputs 102, but as discussed in more detail below, the encoder-decoder 110 is configured to generate the merged output more accurately than the underlying extraction models which generate the extraction model outputs 102. The encoder-decoder 110 is shown to include an encoder 110(A) and a decoder 110(B). The encoder 110(A) is configured to receive the inter-model concatenated data and to generate a plurality of hidden state representations of the associated source text, and the decoder 110(B) is configured to sequentially generate the source text token by token. In some aspects, the encoder-decoder 110 may be a Byt5 encoder-decoder model, or another character aware multimodal encoder-decoder model. For example, the encoder-decoder model may instead operate in accordance with LiLT or LayoutLM via a plug and play encoder-decoder framework.

In accordance with some implementations, the encoder-decoder 110 may be trained to generate the merged output based on inter-model concatenated data associated with one or more training documents. More particularly, the encoder-decoder 110 may be trained using training data based on the inter-model concatenated data associated with the training documents and based on ground truth data 106 associated with the same training documents. Training the encoder-decoder 110 may be framed as a multimodal text generation problem in which the text of the input document is reconstructed from the character recognition data 104 and the extraction model outputs 102 from the extraction models, using the ground truth values 106 to gauge the accuracy of the reconstruction. A multimodal text generation problem in this context refers to the generation of text corresponding to a source document based on multiple inputs, and more specifically based on multiple types of input, such as the extraction model outputs 102 and the character recognition data 104. Thus, a solution to this multimodal text generation problem includes a plurality of representations of the source text, where the "source text" refers to text entries in one or more input documents, such as key-value pairs in the one or more training documents or subsequently received input documents. The source text may also refer to other information relating to the training documents or input documents, such as layout information, bounding boxes, image embedding information, and so on.

Once trained, the encoder-decoder 110 is configured to generate merged output including a plurality of key-value pairs for input documents based on the extraction model outputs 102 from corresponding extraction models. Applicant has found that the accuracy of the example merged extraction system 100 identifies key-value pairs in input documents with a greater accuracy as compared to other techniques. For example, when identifying key-value pairs for W-2 tax forms, the example implementations identified key-value pairs with a greater accuracy than existing single extraction model based techniques. For example, the merged extraction system 100 described herein was shown to identify key-value pairs with a greater accuracy when compared to conventional Amazon Web Services (AWS) Textract or BERT based extraction models. Further, the example implementations identified key-value pairs with a greater accuracy when compared with simple merging systems where multiple extraction models are employed, and the output having the highest calibrated confidence is selected for each value from among the multiple extraction model outputs. Finally, Applicant has found that the accuracy of the example implementations compares favorably with an "oracle" accuracy, which is computed assuming advanced knowledge of whether each extraction model correctly identifies a key-value pair, and selection of correct extracted values based on this knowledge. Comparing the example implementations with this oracle accuracy for a number of fields of the W-2 data Applicant finds that the example implementations are typically within 1% of each other, and always within 5%. These comparisons demonstrate that the example implementations offer greater accuracy than existing techniques and compare favorably with even the more theoretical oracle accuracy.

Figure 2:
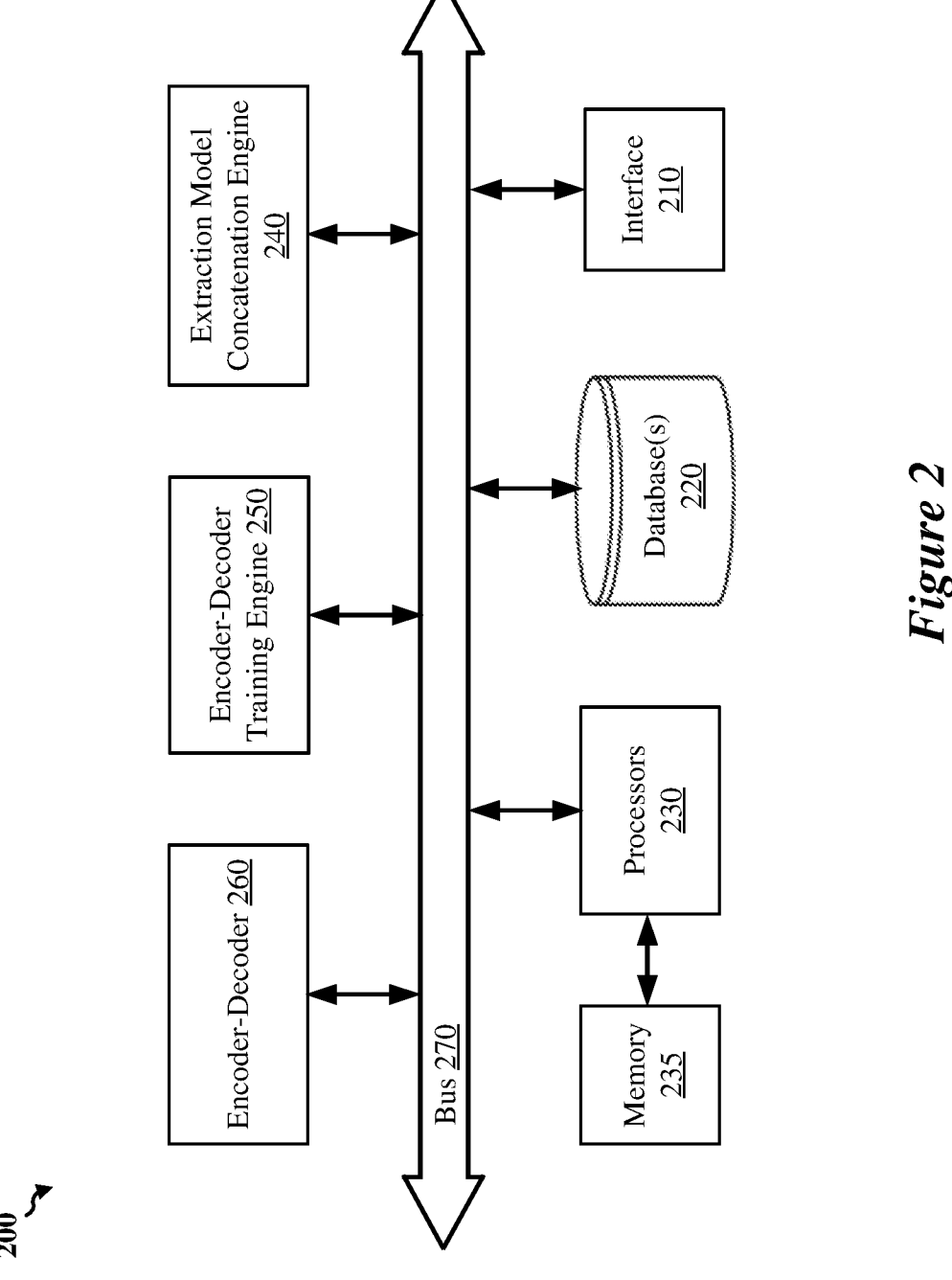
FIG. 2 shows a merged extraction system, according to some implementations.

FIG. 2 shows a merged extraction system 200, according to some implementations. The merged extraction system 200 is shown to include an input/output (I/O) interface 210, a database 220, one or more data processors 230, a memory 235 coupled to the data processors 230, an extraction model concatenation engine 240, an encoder-decoder training engine 250, and an encoder-decoder 260. In some implementations, the various components of the merged extraction system 200 may be interconnected by at least a data bus 270, as depicted in the example of FIG. 2. In other implementations, the various components of the merged extraction system 200 may be interconnected using other suitable signal routing resources.

The interface 210 may include a screen, an input device, and other suitable elements that allow a user to provide information to the merged extraction system 200 and/or to retrieve information from the merged extraction system 200. Example information that can be provided to the merged extraction system 200 may include configuration information for the merged extraction system 200, training data for the encoder-decoder 260, such as including outputs from a plurality of extraction models corresponding to predicted text, such as predicted key-value pairs associated with one or more training documents and ground-truth data corresponding to the same training documents, and so on. Example information that can be retrieved from the merged extraction system 200 may include data representing an encoder-decoder trained by the merged extraction system 200, prediction data generated by the merged extraction system 200, such as predicted key-value pairs or other text and data associated with text extractions generated by the encoder-decoder 260, and the like.

The database 220, which may represent any suitable number of databases, may store any suitable information pertaining to training and input data for the encoder-decoder 260, configuration information for the merged extraction system 200, one or more rules or algorithms for training the encoder-decoder 260, or the like. In some implementations, the database 220 may be a relational database capable of presenting the information as data sets to a user in tabular form and capable of manipulating the data sets using relational operators. In some aspects, the database 220 may use Structured Query Language (SQL) for querying and maintaining the database 220.

The data processors 230, which may be used for general data processing operations (such as manipulating the data sets stored in the database 220), may be one or more suitable processors capable of executing scripts or instructions of one or more software programs stored in the merged extraction system 200 (such as within the memory 235). The data processors 230 may be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 230 may be implemented as a combination of computing devices (such as a combination of a DSP and a microprocessor, a plurality of microprocessors, one or more microprocessors in conjunction with a DSP core, or any other such configuration).

The memory 235, which may be any suitable persistent memory (such as non-volatile memory or non-transitory memory) may store any number of software programs, executable instructions, machine code, algorithms, and the like that can be executed by the data processors 230 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The extraction model concatenation engine 240 may receive outputs from a plurality of extraction models and generate a concatenated input for input to the encoder-decoder 260, such as for training purposes or for document extraction using the trained encoder-decoder 260. More particularly, the extraction model concatenation engine 240 may perform inter-model concatenation of the extraction model outputs as discussed above with respect to FIG. 1. Thus, the extraction model concatenation engine 240 may group the extraction model outputs 102 by field name/key, while separating the respective values of the respective extraction models by a first delimiter, such as "|" or another suitable delimiter. In some aspects, different fields of the inter-model concatenated data may also be separated by a second delimiter different from the first delimiter, such as "||" or another suitable delimiter. Thus, the ordering of the values may indicate which extraction model is associated with which value. In addition, the extraction model concatenation engine 240 may additionally receive character recognition data, such as optical character recognition data, and include it in the inter-model concatenation, such as including the character recognition data and separating it from the key-value data of the extraction model outputs by a third delimiter, such as "$$" or another suitable delimiter different from the first and second delimiters. As discussed above, the inter-model concatenation generated by the extraction model concatenation engine 240 may also include additional information associated with the input document, such as layout information, image embedding information, and so on. In some aspects, this additional information may be separated from the key-value information and the character recognition data by a fourth delimiter different from the first, second and third delimiters.

The encoder-decoder training engine 250 may generate training data for training the encoder-decoder 260 based on inter-model concatenation data for one or more training documents (e.g., generated by the extraction model concatenation engine 240) and ground truth data corresponding to the one or more training documents. The training data may, for example, be stored in database 220.

The encoder-decoder 260 may include a number of machine learning models that can be used to predict key-value pairs and other data associated with input documents provided to the encoder-decoder 260. The architecture of the encoder-decoder 260 is a deep learning architecture including two main components, an encoder and a decoder. More particularly, the encoder-decoder 260 may include at least a first machine learning model (the encoder), and a second machine learning model (the decoder). The first and second machine learning models may each be, for example, a neural network such as a recurrent neural network (RNN), a long short-term memory (LSTM) model, a convolutional neural network (CNN), and so on. The first machine learning model is configured to receive merged extraction model data, such as the inter-model concatenated data generated by the extraction model concatenation engine 240 or the output concatenation module 108, and to output a plurality of hidden state representations of the input document corresponding to the merged extraction model data. The second machine learning model is configured to receive the output of the first machine learning model and to generate outputs indicating key-value data associated with the input document.

The particular architecture of the merged extraction system 200 shown in FIG. 2 is but one example of a variety of different architectures within which aspects of the present disclosure may be implemented. For example, in other implementations, the merged extraction system 200 may not include extraction model concatenation engine 240, the functions of which may be implemented by the processors 230 executing corresponding instructions or scripts stored in the memory 235. In some other implementations, the functions of the encoder-decoder training engine 250 may be performed by the processors 230 executing corresponding instructions or scripts stored in the memory 235. Similarly, the functions of the encoder-decoder 260 may be performed by the processors 230 executing corresponding instructions or scripts stored in the memory 235.

Figure 3:
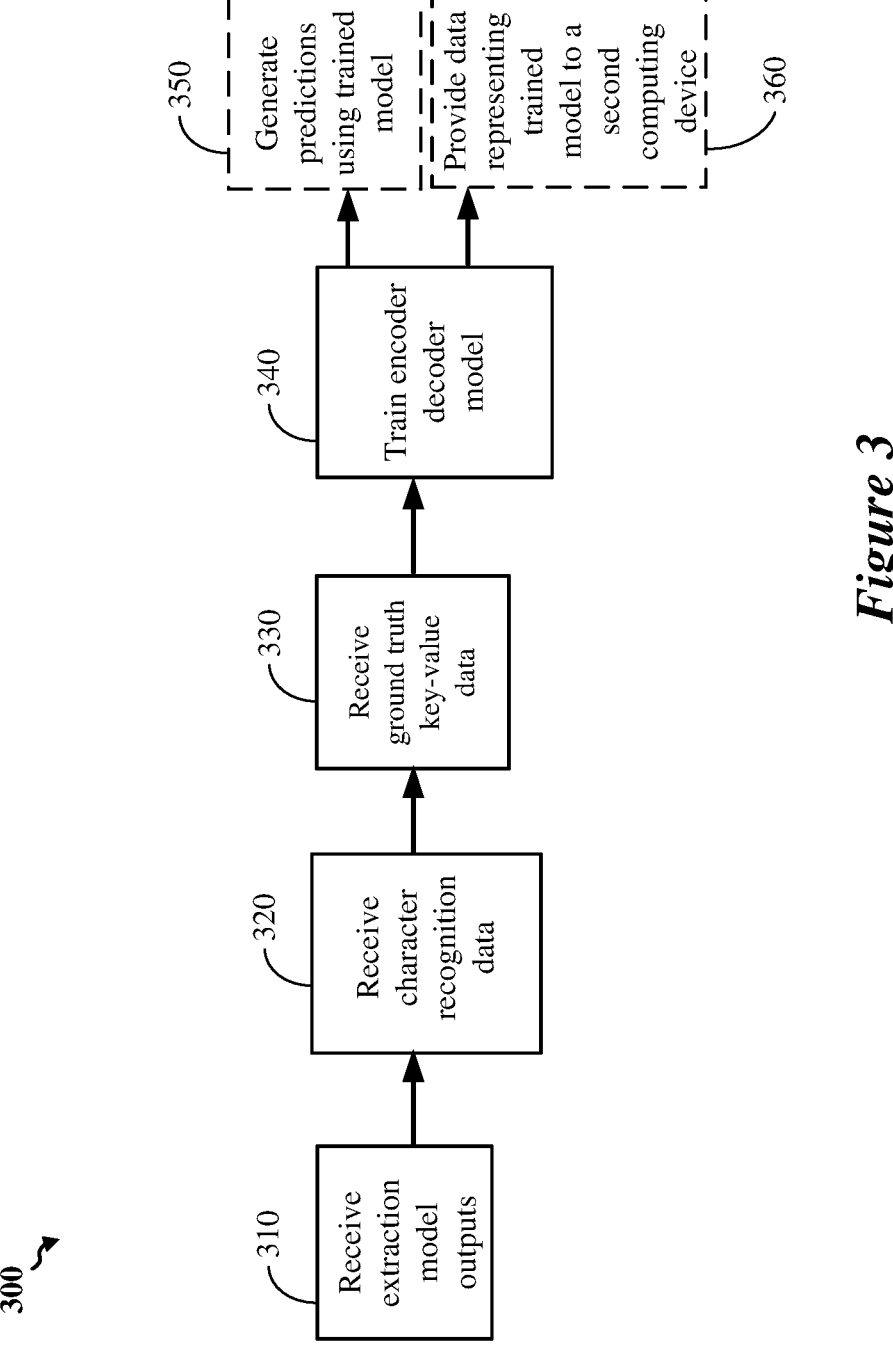
FIG. 3 shows a high-level overview of an example process flow that may be employed by the merged extraction system of FIG. 1 or the merged extraction system of FIG. 2.

FIG. 3 shows a high-level overview of an example process flow 300 that may be employed by the merged extraction system 100 of FIG. 1 or the merged extraction system 200 of FIG. 2. In block 310, the merged extraction system 100 receives, over a communications network, a plurality of extraction model outputs from a corresponding plurality of extraction models, each extraction model output including key-value pairs from one or more training documents. For example, the communications network may be a network connecting multiple computers, such as a local network, a wide area network, or the internet, or may be an internal data network within the merged extraction system 100, such as a bus (for example the bus 270 of FIG. 2). In block 320, the merged extraction system 100 receives, over the communications network, character recognition data corresponding to the one or more training documents. In block 330, the merged extraction system 100 receives, over the communications network, ground truth key-value data corresponding to the one or more training documents. In block 340, the merged extraction system 100 trains an encoder-decoder model based at least in part on the plurality of extraction model outputs, the character recognition data, and the ground truth key-value data. Optionally, in block 350, the trained encoder-decoder model may generate one or more predicted key-value pairs corresponding to input documents different from the one or more training documents. In block 360, the merged extraction system 100 may optionally provide data representing the trained encoder-decoder to a second computing device. For example, after training the encoder-decoder model, data representing the trained model may be sent to the second computing device so that the second computing device may generate one or more predicted key-value pairs corresponding to input documents different from the one or more training documents by executing the data representing the trained encoder-decoder model.

FIG. 4 shows an illustrative flow chart depicting an example operation 400 for training an encoder-decoder model to extract information from one or more documents, according to some implementations. The example operation 400 may be performed by one or more processors of a computing device, and in some implementations, the example operation 400 may be performed using the merged extraction system 100 of FIG. 1 or the merged extraction system 200 of FIG. 2. It is to be understood that the example operation 400 may be performed by any suitable systems, computers, or servers.

At block 402, the merged extraction system 100 receives, over a communications network, a plurality of extraction model outputs from a corresponding plurality of extraction models, each extraction model output received from a corresponding extraction model and each extraction model output including a respective plurality of key-value pairs corresponding to extracted text from one or more training documents. At block 404, the merged extraction system 100 receives, over the communications network, character recognition data corresponding to the one or more training documents. At block 406, the merged extraction system 100 receives, over the communications network, ground truth key-value data corresponding to the one or more training documents. At block 408, the merged extraction system 100 trains the encoder-decoder model based at least in part on the plurality of extraction model outputs, the character recognition data, and the ground truth key-value data, wherein the trained encoder-decoder model is configured to generate key-value pairs for subsequent outputs of the plurality of extraction models.

In some aspects, the encoder-decoder model includes a first plurality of neural network layers corresponding to an encoder and a second plurality of neural network layers corresponding to a decoder. In some aspects, the encoder is configured to generate a plurality of hidden state representations of source text from the one or more training documents. In some aspects, the decoder is configured to receive the plurality of hidden state representations and generate a sequence of output key-value pairs corresponding to respective entries in the source text. In some aspects, key-value pairs of the sequence of output key-value pairs are separated by a first predetermined delimiter. In some aspects, the first plurality of neural network layers and the second plurality of neural network layers include respective pluralities of recurrent neural network (RNN) layers.

In some aspects, the encoder-decoder model includes a character-aware text encoder-decoder model.

In some aspects, the plurality of extraction model outputs are each based at least in part on the character recognition data corresponding to the one or more training documents.

In some aspects, training the encoder-decoder model in block 408 includes training the encoder-decoder model to solve multimodal text generation problem based at least in part on the ground truth key-value data. In some aspects, an input to the multimodal text generation problem is constructed from the character recognition data and the plurality of extraction model outputs. In some aspects, the input to the multimodal text generation problem is further based at least in part on at least one extraction confidence score associated with a respective extraction model output of the plurality of extraction model outputs.

In some aspects, the operation 400 further includes generating an input to the encoder-decoder model based at least in part on concatenating the extraction model outputs of the plurality of extraction model outputs. In some aspects, concatenating the extraction model outputs includes generating a plurality of field predictions separated by a first predetermined delimiter, where each field prediction includes a field name and an ordered plurality of predicted field values separated by a second predetermined delimiter, where each predicted field value is generated by a different extraction model, and includes a predicted value associated with the field name. In some aspects, generating the input to the encoder-decoder model further includes concatenating layout information corresponding to the one or more training documents with the extraction model outputs, the layout information indicating one or more bounding boxes associated with the one or more training documents.

In some aspects, the operation 400 further includes, after training the encoder-decoder model, receiving a plurality of subsequent outputs from the plurality of extraction models, the subsequent outputs indicating predicted key-value pairs associated with one or more subsequent documents, and predicting, using the trained encoder-decoder model, a sequence of output key-value pairs corresponding to the one or more subsequent documents.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method of training an encoder-decoder model to extract information from one or more documents, the method performed by an electronic device coupled to the encoder-decoder model and comprising:

receiving, over a communications network, a plurality of extraction model outputs from a corresponding plurality of extraction models, each extraction model including a respective plurality of key-value pairs corresponding to extracted text from one or more training documents;

receiving, over the communications network, character recognition data corresponding to the one or more training documents;

receiving, over the communications network, ground truth key-value data corresponding to the one or more training documents;

training the encoder-decoder model based at least in part on the plurality of extraction model outputs, the character recognition data, and the ground truth key-value data, wherein the trained encoder-decoder model is configured to generate key-value pairs for subsequent outputs of the plurality of extraction models; and generating an input to the encoder-decoder model based at least in part on concatenating the extraction model outputs by generating a plurality of field predictions separated by a first predetermined delimiter, wherein each field prediction includes a field name and an ordered plurality of predicted field values separated by a second predetermined delimiter, each predicted field value generated by a different extraction model and including a predicted value associated with the field name.

2. The method of claim 1, wherein the encoder-decoder model comprises a first plurality of neural network layers corresponding to an encoder and a second plurality of neural network layers corresponding to a decoder.

3. The method of claim 2, wherein the encoder is configured to generate a plurality of hidden state representations of source text from the one or more training documents.

4. The method of claim 3, wherein the decoder is configured to receive the plurality of hidden state representations and generate a sequence of output key-value pairs corresponding to respective entries in the source text.

5. The method of claim 1, wherein the plurality of extraction model outputs are each based at least in part on the character recognition data corresponding to the one or more training documents.

6. The method of claim 1, wherein the encoder-decoder model comprises a character-aware text encoder-decoder model.

7. The method of claim 1, wherein training the encoder-decoder model comprises training the encoder-decoder model to solve a multimodal text generation problem based at least in part on the ground truth key-value data.

8. The method of claim 7, wherein an input to the multimodal text generation problem is constructed from the character recognition data and the plurality of extraction model outputs.

9. The method of claim 8, wherein the input to the multimodal text generation problem is further based on at least one extraction confidence score associated with a respective extraction model output of the plurality of extraction model outputs.

10. The method of claim 1, wherein generating the input to the encoder-decoder model further comprises concatenating layout information corresponding to the one or more training documents with the extraction model outputs, the layout information indicating one or more bounding boxes associated with the one or more training documents.

11. A method of training an encoder-decoder model to extract information from one or more documents, the method performed by an electronic device coupled to the encoder-decoder model and comprising:

receiving, over a communications network, a plurality of extraction model outputs from a corresponding plurality of extraction models, each extraction model including a respective plurality of key-value pairs corresponding to extracted text from one or more training documents;

receiving, over the communications network, character recognition data corresponding to the one or more training documents;

receiving, over the communications network, ground truth key-value data corresponding to the one or more training documents;

training the encoder-decoder model based at least in part on the plurality of extraction model outputs, the character recognition data, and the ground truth key-value data, wherein the trained encoder-decoder model is configured to generate key-value pairs for subsequent outputs of the plurality of extraction models;

receiving a plurality of subsequent outputs from the plurality of extraction models, the subsequent outputs indicating predicted key-value pairs associated with one or more subsequent documents; and predicting, using the trained encoder-decoder model and the subsequent outputs, a sequence of output key-value pairs corresponding to the one or more subsequent documents.

12. A system for training an encoder-decoder model to extract information from one or more documents, the system associated with the encoder-decoder model and comprising:

one or more processors; and a memory storing instructions that, when executed by the one or more processors, cause the system to perform operations comprising:

receiving, over a communications network, a plurality of extraction model outputs from a corresponding plurality of extraction models, each extraction model output including a respective plurality of key-value pairs corresponding to extracted text from one or more training documents;

receiving, over the communications network, character recognition data corresponding to the one or more training documents;

receiving, over the communications network, ground truth key-value data corresponding to the one or more training documents;

training the encoder-decoder model based at least in part on the plurality of extraction model outputs, the character recognition data, and the ground truth key-value data, wherein the trained encoder-decoder model is configured to generate key-value pairs for subsequent outputs of the plurality of extraction models;

receiving a plurality of subsequent outputs from the plurality of extraction models, the subsequent outputs indicating predicted key-value pairs associated with one or more subsequent documents; and predicting, using the trained encoder-decoder model, a sequence of output key-value pairs corresponding to the one or more subsequent documents.

13. The system of claim 12, wherein the encoder-decoder model comprises a first plurality of neural network layers corresponding to an encoder configured to generate a plurality of hidden state representations of source text from the one or more training documents, and a second plurality of neural network layers corresponding to a decoder configured to receive the plurality of hidden state representations and generate a sequence of output key-value pairs corresponding to respective entries in the source text.

14. The system of claim 12, wherein the plurality of extraction model outputs are each generated based at least in part on the character recognition data corresponding to the one or more training documents.

15. The system of claim 12, wherein training the encoder-decoder model comprises training the encoder-decoder model to solve a multimodal text generation problem based at least in part on the ground truth key-value data.

16. The system of claim 12, wherein execution of the instructions causes the system to perform operations further comprising generating an input to the encoder-decoder model based at least in part on concatenating the extraction model outputs of the plurality of extraction model outputs.

17. A system for training an encoder-decoder model to extract information from one or more documents, the system associated with the encoder-decoder model and comprising:

one or more processors; and a memory storing instructions that, when executed by the one or more processors, cause the system to perform operations comprising:

receiving, over a communications network, a plurality of extraction model outputs from a corresponding plurality of extraction models, each extraction model including a respective plurality of key-value pairs corresponding to extracted text from one or more training documents;

receiving, over the communications network, character recognition data corresponding to the one or more training documents;

receiving, over the communications network, ground truth key-value data corresponding to the one or more training documents;

training the encoder-decoder model based at least in part on the plurality of extraction model outputs, the character recognition data, and the ground truth key-value data, wherein the trained encoder-decoder model is configured to generate key-value pairs for subsequent outputs of the plurality of extraction models; and generating an input to the encoder-decoder model based at least in part on concatenating the extraction model outputs by generating a plurality of field predictions separated by a first predetermined delimiter, wherein each field prediction includes a field name and an ordered plurality of predicted field values separated by a second predetermined delimiter, each predicted field value generated by a different extraction model and including a predicted value associated with the field name.

18. The system of claim 17, wherein the encoder-decoder model comprises a first plurality of neural network layers corresponding to an encoder and a second plurality of neural network layers corresponding to a decoder.

19. The system of claim 18, wherein the encoder is configured to generate a plurality of hidden state representations of source text from the one or more training documents.

20. The system of claim 19, wherein the decoder is configured to receive the plurality of hidden state representations and generate a sequence of output key-value pairs corresponding to respective entries in the source text.

* * * * *